United States Patent [19]
Matthews et al.

[11] Patent Number: 5,211,142
[45] Date of Patent: May 18, 1993

[54] MINIATURE RAILGUN ENGINE IGNITOR

[75] Inventors: Ronald D. Matthews; Steven P. Nichols; William F. Weldon; Mark M. Koeroghlian; Richard W. Faidley, all of Austin, Tex.

[73] Assignee: Board of Regents, The University of Texas System, Austin, Tex.

[21] Appl. No.: 815,378

[22] Filed: Dec. 31, 1991

Related U.S. Application Data

[63] Continuation-in-part of Ser. No. 502,264, Mar. 30, 1990, Pat. No. 5,076,223.

[51] Int. Cl.⁵ .......................... F02P 1/00; F02P 23/00; H01T 13/20
[52] U.S. Cl. .................. 123/143 B; 313/143
[58] Field of Search ......... 123/143 R, 143 B, 169 EB, 123/169 EL, 169 EC, 149 A, 620; 313/141, 142, 143, 231.14

[56] References Cited

U.S. PATENT DOCUMENTS

| | | | |
|---|---|---|---|
| Re. 32,505 | 9/1987 | Hensley et al. | 361/257 |
| 1,307,088 | 6/1919 | Drummond . | |
| 2,833,265 | 5/1958 | Hindle et al. | 123/661 |
| 2,864,974 | 12/1958 | Smits | 315/214 |
| 2,879,451 | 3/1959 | Sherwood et al. | 315/214 |
| 2,894,161 | 7/1959 | Sheheen | 313/131 |
| 3,032,683 | 5/1962 | Ruckelshaus | 315/180 |
| 3,219,866 | 11/1965 | Dingman | 313/118 |
| 3,515,937 | 6/1970 | Collins | 315/209 R |
| 3,551,738 | 12/1970 | Young | 315/171 |
| 3,723,809 | 3/1973 | Fujii | 315/211 |
| 3,842,819 | 10/1974 | Atkins et al. | 123/169 MG |
| 3,896,322 | 7/1975 | Sawada et al. | 313/142 |
| 3,911,307 | 10/1975 | Goto et al. | 313/143 |
| 3,921,605 | 11/1975 | Wyczalek | 123/143 B |
| 3,958,144 | 5/1976 | Franks | 313/138 |
| 4,041,922 | 8/1977 | Abe et al. | 123/260 |
| 4,071,800 | 1/1978 | Atkins et al. | 313/123 |
| 4,122,816 | 10/1978 | Fitzgerald et al. | 123/598 |
| 4,200,831 | 4/1980 | Weldon et al. | 322/8 |
| 4,203,393 | 5/1980 | Giardini et al. | 123/260 |
| 4,333,125 | 6/1982 | Hensley et al. | 361/257 |
| 4,398,526 | 8/1983 | Hamai et al. | 123/606 |
| 4,402,036 | 8/1983 | Hensley et al. | 361/257 |
| 4,471,732 | 9/1984 | Tozzi | 123/143 B |
| 4,487,192 | 12/1984 | Anderson et al. | 123/654 |
| 4,493,297 | 1/1985 | McIlwain et al. | 123/143 B |
| 4,510,915 | 4/1985 | Ishikawa et al. | 123/620 |
| 4,546,740 | 10/1985 | Clements et al. | 123/304 |
| 4,760,820 | 8/1988 | Tozzi | 123/143 B |
| 4,766,855 | 8/1988 | Tozzi | 123/143 B |
| 5,076,223 | 12/1991 | Harden et al. | 123/143 B |

FOREIGN PATENT DOCUMENTS

| | | |
|---|---|---|
| 3821688.4 | 1/1990 | Fed. Rep. of Germany . |
| 2253297 | 6/1975 | France . |
| 2347803 | 11/1977 | France . |
| 52-54818 | 5/1977 | Japan .............................. 123/143 B |
| 55-156264 | 12/1980 | Japan .............................. 123/143 B |
| 2043773 | 10/1980 | United Kingdom . |
| 2086986 | 5/1982 | United Kingdom . |
| 2199075 | 6/1988 | United Kingdom . |

OTHER PUBLICATIONS

Fitzergald, "Pulsed Plasma Ignitor for Internal Combustion Engines," Jet Propulsion Laboratory, California Institute of Technology, Society of Automotive Engineers, pp. 1-6. Published by SAE Publications Division in Warrendale, PA (Oct. 1976).

Cetegen, B. et al., "Performance of a Plasma Jet Ignitor," Society of Automotive Engineers, Inc., pp. 1-14. Published by SAE Publications Division in Warrendale, PA (Feb. 1980).

(List continued on next page.)

*Primary Examiner*—Willis R. Wolfe
*Attorney, Agent, or Firm*—Arnold, White & Durkee

[57] ABSTRACT

A plasma ignitor system capable of injecting a high energy plasma jet into a combustion chamber of an internal combustion engine or continuous combustion system. The plasma ignitor features a high energy current pulse source and a geometrically configured coaxial, dual-rail or three-rail ignitor system for deeper and more accurate injection of plasma into a combustion chamber of either large or small dimension.

59 Claims, 8 Drawing Sheets

U.S. PATENT DOCUMENTS

Oppenheim, A. K. et al., "Jet Ignition of an Ultra-Lean Mixture," Society of Automotive Engineers, pp. 2416–2428. Published by SAE Publications Division in Warrendale, PA Jan. 1979.

Clements, R. M. et al., "An Experimental Study of the Ejection Mechanism for Typical Plasma Jet Ignitors," Combustion and Flame, 42:287–295. Published by Elsevier North Holland, Inc. in New York, NY (Jan. 1981).

Orrin, J. E. et al., "Ignition by Radiation from Plasmas," Combustion and Flame, 37:91–93. Published by Elsevier North Holland, Inc. in New York, NY (Jan. 1980).

Asik, J. R. et al., "Design of a Plasma Jet Ignition System for Automotive Application," Society of Automotive Engineers, pp. 1516–1530. Published by SAE Publications Division in Warrendale, PA (Jan. 1978).

Weinberg, F. et al., "Ignition by Plasma Jet," Nature, 272:341–343 (Mar. 23, 1978), Published by Nature Publishing Co., New York, NY.

Topham, D. R. et al., "An Investigation of a Coaxial Spark Ignitor with Emphasis on its Practical Use." Combustion and Flame, 28:187–195. Published by Elsevier North Holland, Inc. in New York, NY (Mar. 1975).

Dale, J. et al., "The Effects of a Coaxial Spark Ignitor on the Performance of and the Emissions from an Internal Combustion Engine," Combustion and Flame, 31:173–185. Published by Elsevier North Holland, Inc. in New York, NY (Jan. 1978).

Bradley, D. and Critchley, I. L., "Electromagnetically Induced Motion of Spark Ignition Kernels," Combustion and Flame, 22:143–152. Published by Elsevier North Holland, Inc. in New York, NY (Jan. 1974).

Harrison, A. J. and Weinberg F. J., "A Note on Electromagnetically Induced Motion of Spark Ignition Kernels," Combustion and Flame, 22:263–265. Published by Elsevier North Holland, Inc. in New York, NY (Jan. 1974).

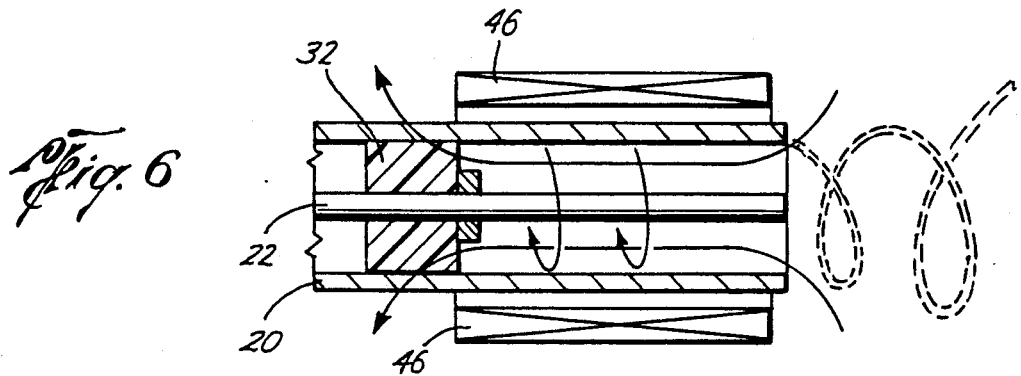
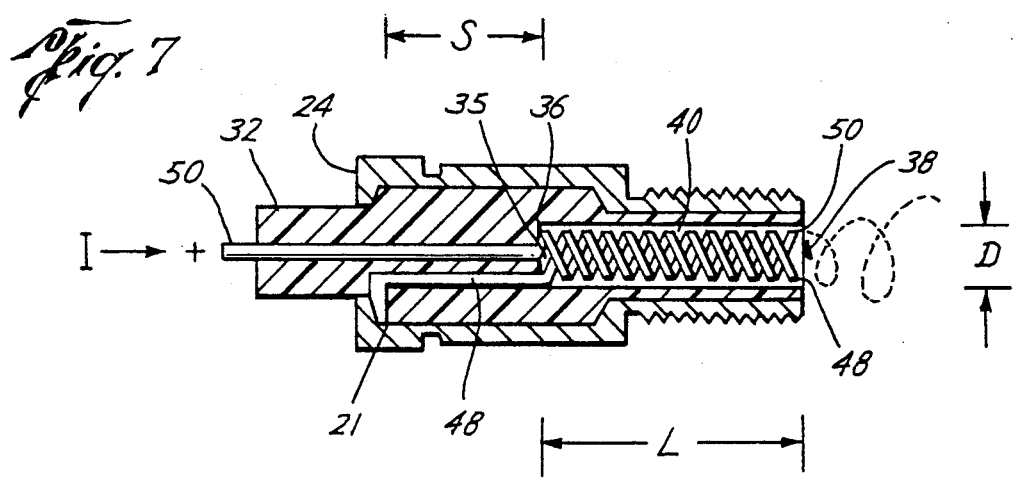
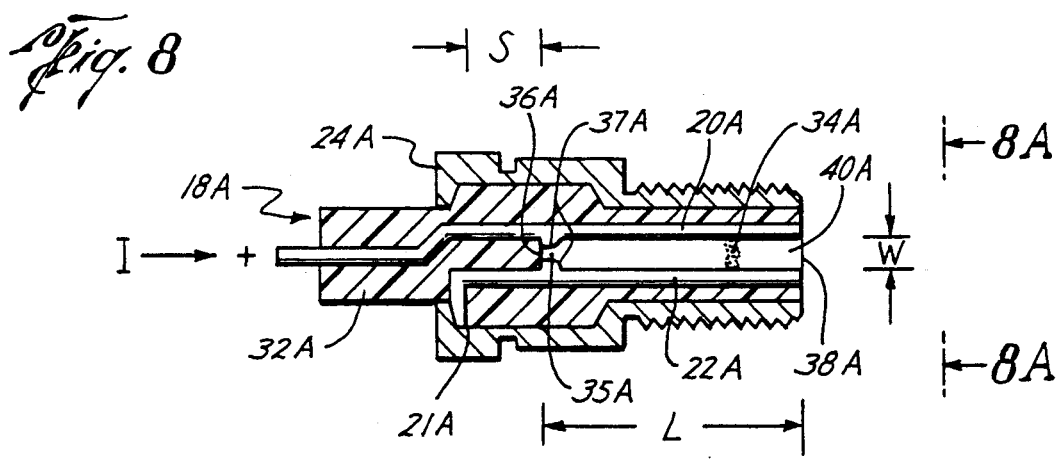
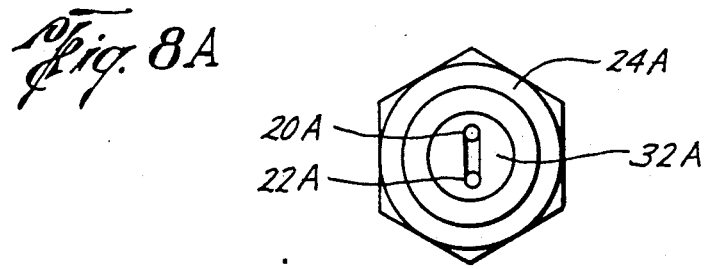

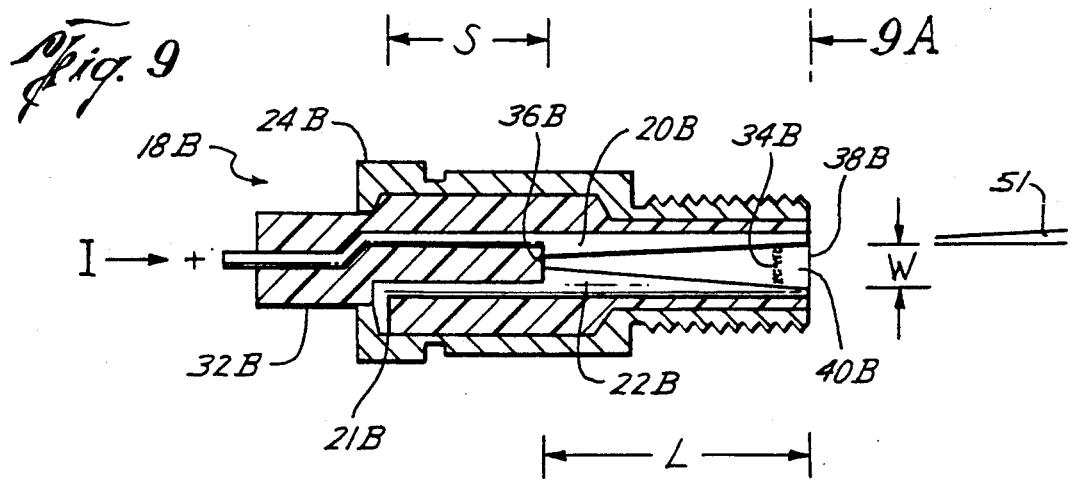
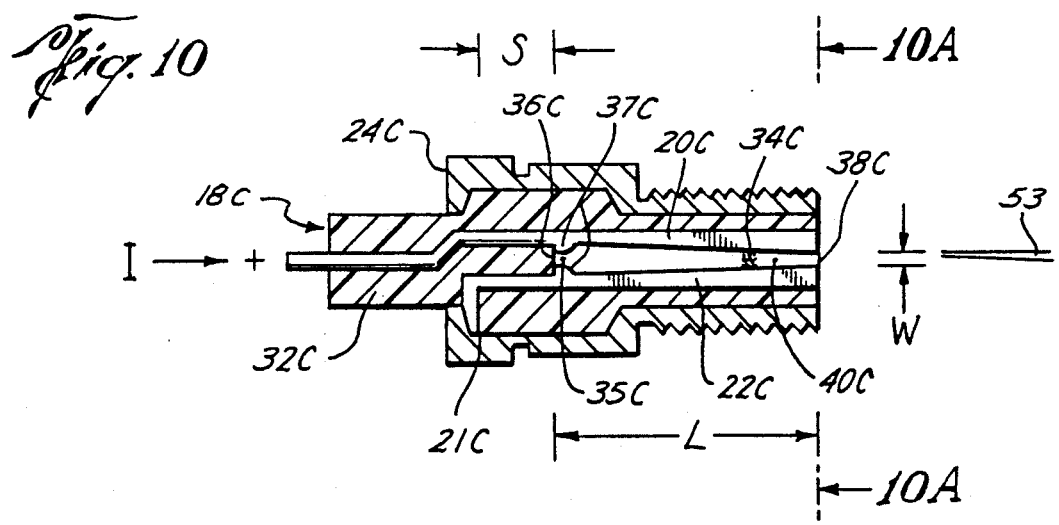
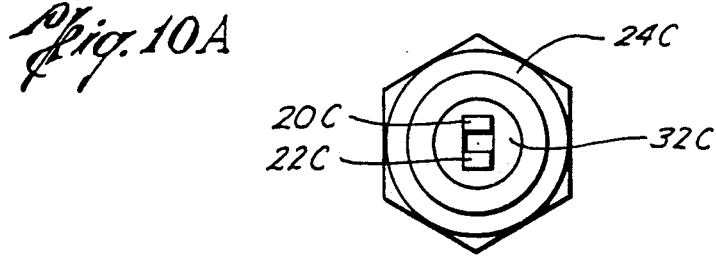

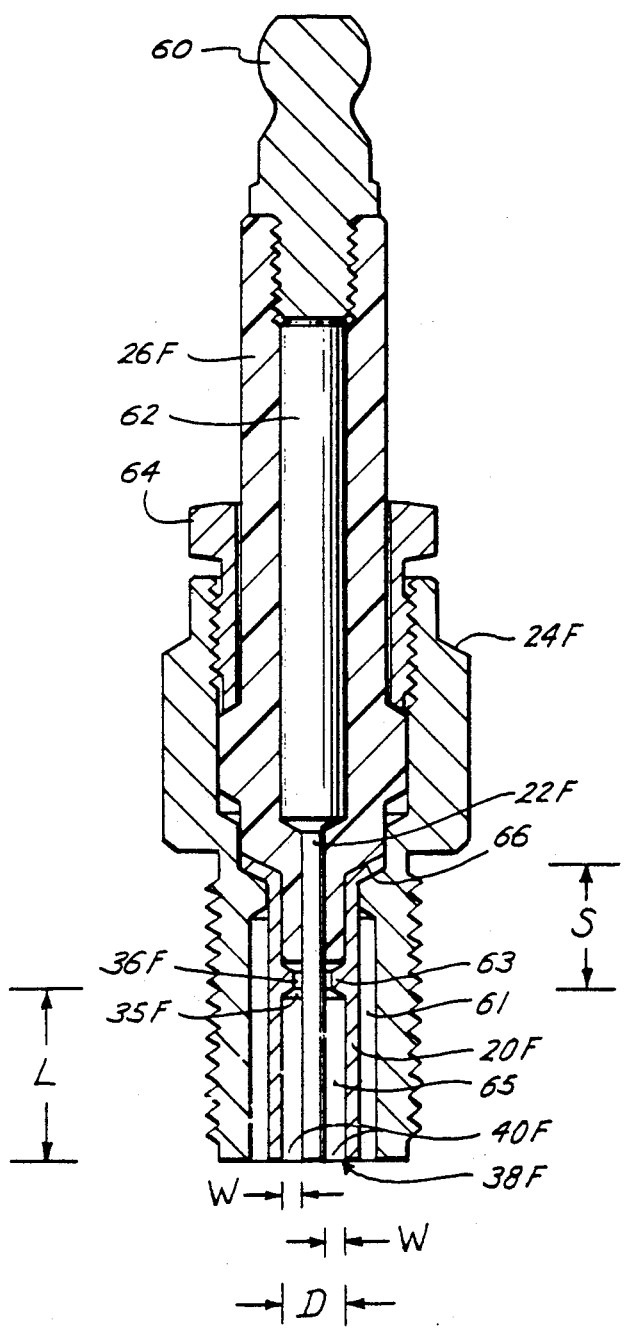
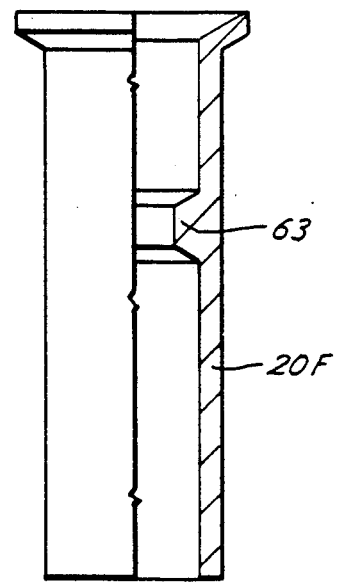
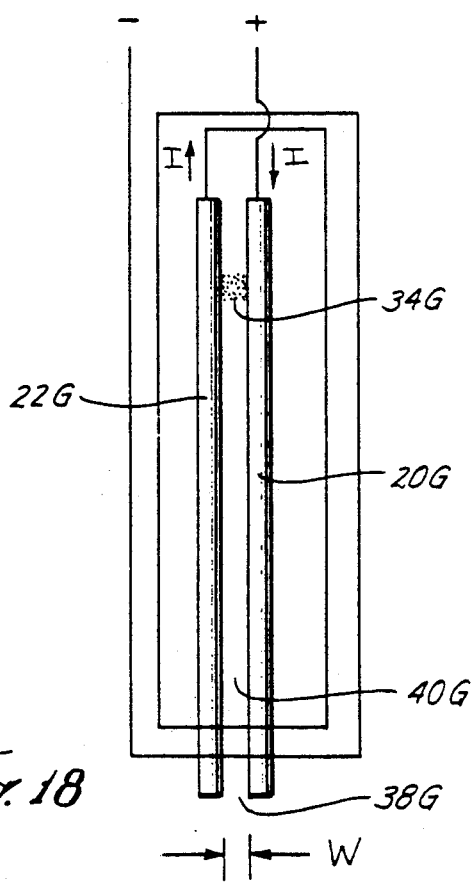

MINIATURE RAILGUN ENGINE IGNITOR

BACKGROUND OF THE INVENTION

This is a continuation-in-part application of application Ser. No. 07/502,264, filed on Mar. 30, 1990 now U.S. Pat. No. 5,076,223 issued Dec. 31, 1991.

The invention relates to a method and apparatus for managing the penetration of high energy, high velocity plasma into a combustion chamber of an internal combustion engine or a continuous combustion system.

With the need both to conserve fuel and to protect the environment, new methods are sought to increase the efficiency of conventional internal combustion engines or continuous combustion systems. One method is to operate the engine at a much leaner fuel-to-air mixture. This will reduce the fuel requirements while also lowering the amounts of pollutants emitted into the air. Although using leaner mixtures seems an obvious solution, various problems arise in developing lean-burning engines. One problem is that leaner mixtures do not reliably ignite with conventional electrical spark mechanisms. In order to ignite the leaner mixtures, a much hotter electrical energy source is required. Thus, researchers have turned to high energy plasma jet ignitors as a means for providing the necessary higher ignition temperature for lean-burn engines.

In addition, ignition does not guarantee effective combustion of the fuel-air mixture. Lean mixtures have a much lower unstretched laminar flame speed (a thermochemical property) than the stoichiometric to slightly rich mixtures commonly used. This slow burning results in decreased thermal efficiency of the engine and a consequent increase in fuel consumption. Further, lean mixtures have a low energy release rate per unit volume of combustible mixture. If the ignition source is located adjacent to the relatively cool combustion chamber walls, as with a conventional spark plug, the rate of heat loss to the walls can be greater than the energy liberation rate due to combustion, thus leading to flame quench, incomplete combustion, increased fuel consumption, and increased hydrocarbon emissions. Further, as the mixture becomes increasingly lean, misfire and partial burn limits are encountered. Eventually the lean operating limit is encountered. The net result is that, as the mixture becomes progressively leaner, the hydrocarbon emissions begin to increase rather than decrease as expected.

The "partial burn limit" is a result of flame stretch extinguishing the flame during early flame development. The unconsumed fuel, in the region of the combustion chamber through which the flame has not passed, appears in the exhaust as unburned hydrocarbons. The "lean operating limit" is defined as the mixture for which the coefficient of variation of the indicated mean effective pressure becomes excessive or, in other words, the cyclic variability is sufficiently severe that the engine operates erratically. This is most important at idle. This cyclic variability is due to three factors: misfire on some cycles, partial burn on other cycles, and on the remaining cycles, variation of the rate of combustion during the early stages of combustion. The variation of the initial rate of combustion has been shown to be due to differences in the direction of migration of the initial spark kernel, which is being pushed around by relatively larger turbulent eddies. Thus, it has been argued that cyclic variations cannot be established once the flame kernel is larger than a critical size.

One solution to these problems is to ignite the mixture on a larger (global) scale instead of at a point. This reduces the distance the flame must propagate and minimizes flame quench. Further, the ignitor should induce turbulence in the combustion chamber. This increases the burning rate. One method proposed for achieving global ignition and inducing turbulence is the use of plasma jet ignitors for leanburn engines.

Many types of plasma jet ignitors have been proposed. The earliest was originally developed in Russia and is disclosed in U.S. Pat. No. 4,041,922. This type of plasma jet ignitor is also known as a torch cell or torch ignitor and uses a prechamber separated from the main combustion chamber by an orifice. An essentially conventional spark plug is located in the prechamber. When the spark jumps the spark plug gap, a very small amount of plasma is formed in the arc. This provides the energy to ignite the combustible mixture in the prechamber. The orifice serves to pressurize the reacting mixture until a jet of reactive species issues from the prechamber and into the main combustion chamber, thereby serving to ignite the lean mixture in the main combustion chamber. Because a conventional spark plug is used in the prechamber, an essentially stoichiometric or rich mixture must be present in the prechamber but the mixture in the main chamber can be sufficiently lean so that the overall mixture is lean. Thus, this device achieves an ignition jet solely through thermal expansion of the combustible mixture in the prechamber and the jet mixture is relatively cool. The jet velocity is much less than the velocity of sound, and the jet temperature and velocity decline as the jet expands.

Another type of plasma jet ignitor is described in U.S. Pat. No. 3,911,307. It is similar to a conventional spark plug but embodies a recessed center electrode and an orifice cap over the cavity formed by recessing the center electrode. The orifice cap serves as the ground electrode. When an arc jumps between the center electrode and the ground electrode, the gases within the arc become ionized. The remaining gases in the cavity are thermally heated by heat transfer from the ionized gases. The orifice serves to pressurize these gases until a jet of reactive species issues from the cavity and into the combustion chamber, thereby serving to ignite the lean mixture in the combustion chamber. Thus, this device achieves an ignition jet solely through thermal expansion of the gases in the cavity and the jet mixture is relatively cool. The jet velocity is limited to the velocity of sound. Also, the jet temperature and velocity decline as the jet expands.

Another type of plasma jet ignitor is described in U.S. Pat. No. 4,122,816. This plasma jet ignitor also has a cavity and an orifice which separates the cavity from the combustion chamber. The orifice is an annulus surrounding the center electrode. The ground electrode surrounds the external portion of the orifice. When an arc jumps the gap across the orifice, the gases within the arc become ionized. The gases within the cavity are thermally heated by heat transfer from the ionized gases. The orifice serves to pressurize the gases within the cavity and the resulting thermal expansion forces a jet out of the cavity. If a combustible mixture is contained within the cavity, the heat transfer will ignite this mixture, providing additional thermal expansion. Additionally, since the inner and outer electrodes are essentially parallel for a short distance, an electromagnetic force is developed which accelerates the plasma away out of the orifice. Thus, this plasma jet ignitor develops a jet both through thermal expansion and through electromagnetic acceleration. However, this device has an essentially continuously increasing plasma surface area and a continuously decreasing magnetic field strength. This results in a continuously decreasing electromagnetic force available to accelerate the plasma. Further, because the electrodes are exposed to each other for only a very short length, the plasma is weakly accelerated from zero velocity for only a very short period of time. Thus, the resulting electromagnetic pressure has been shown to be negligible, and the device achieves an ignition jet primarily through thermal expansion of the gases in the cavity and the jet mixture is relatively cool. The jet velocity is much less than the velocity of sound, and the jet temperature and velocity decline as the jet expands. Finally, since the outer electrode is integrally formed with the structure that is used to mount the ignition in a combustion chamber, the ignitor must extend well into the combustion chamber to avoid complete cancellation of the electromagnetic pressure acting on the plasma.

The plasma jet ignitors discussed above attempt to solve the problems encountered in developing lean-burn engines. U.S. Pat. Nos. 4,203,393 and 4,398,526 recognize that ignition system difficulties may be important for other engine applications. These patents refer to use of plasma jet ignitors similar to that disclosed in U.S. Pat. No. 4,041,922 as applied to direct injection stratified charge spark ignition engines and spark assisted diesels, respectively. In fact, ignition system problems may affect or limit the design of most types of engines and continuous combustion systems.

For conventional spark ignition engines, an increased rate of combustion is advantageous for increasing thermal efficiency, fuel economy, and performance. A high velocity jet of reactive species would serve to decrease the duration of combustion. Cyclic variability, knock tendency, and fuel sensitivity should also decrease. As a second example, achieving cold start of diesel engines is a significant ignition related problem. The ability to produce a high energy plasma jet that can penetrate across the combustion chamber without the need to have a combustible mixture in a cavity or spark initiation gap would result in the ability to force ignition rather than relying on autoignition. Such a device could be used to replace glow plugs in indirect injection diesels or as a cold starting aid for direct injection diesels, either in-cylinder or as the ignitor for a fuel-burning manifold heater.

As another example, the assurance of achieving high altitude relight of aircraft gas turbines is an ignition problem. The ability to produce a high energy plasma jet that can penetrate across the combustion chamber without the need to have a combustible mixture in a cavity or spark initiation gap would be very advantageous for this application.

As another example, 2-stroke spark ignition engines normally misfire on as many as 30% of the engine's cycles at part load, obviously another ignition related problem. As yet another example, methanol fueled spark ignition engines need a high heat range spark plug for cold starting but a lower heat range spark plug for normal operation to avoid preignition off the hot spark plug. Similarly, dual-fuel spark ignition engines (spark ignition engines designed to be operated on gasoline, alcohol, or any blend such as M85—85% methanol and 15% gasoline) must use a spark plug that is three heat ranges lower when using methanol than when using gasoline, to avoid preignition off the hot spark plug. However, lower heat range spark plugs exhibit severe cold fouling problems when gasoline is being used. What is needed is a "cold" plug that resists fouling but delivers sufficient energy to ignite the mixture under adverse conditions.

There are various ways of powering a plasma jet ignitor, the most popular being either a solid-state ignition such as a SCR capacitor discharger or a thyrathron tube, each having a power supply booster circuit. The boosted injector power source can deliver up to 10 Joules per pulse to the injector, which is then selectively channeled to the appropriate plasma jet ignitors.

The design of both the power source and the plasma jet ignitor geometry also demand particular attention. In order to achieve optimal penetration of the jet, it is important that the power source optimize the energy delivered to the injectors while maintaining optimal pulse duration, and also that the point of injection be optimally focused near the center of the combustion chamber. Conventional plasma jet ignitors are limited to only 2 to 3 cm penetration which has proved unsuitable to allow lean-burn engines to achieve sufficiently lean operation for improved fuel economy and decreased emissions.

SUMMARY OF THE INVENTION

The present invention remedies the inherent limitations of prior plasma jet ignitors by utilizing a plasma injector capable of optimizing the plasma jet characteristics to optimize ignition within a combustion chamber. The invention develops a high energy plasma which produces a very high velocity plasma jet which can penetrate sufficiently far into a combustion chamber and which can be focused or spread according to a desired application. Suitable power sources for this new type of ignitor are also presented.

There are several properties that are desirable in an ideal plasma injection system. For example, a large mass of plasma should be created. Since a plasma is developed only in the mixture through which the arc passes, it is desirable to have the arc move through the mixture so as to ionize a much larger volume of gas than is possible with prior plasma jet ignitors, in which the arc jumps only from one electrode to the other but does not sweep through the gases. Second, the plasma jet should have a high velocity. The higher the velocity, the greater the jet penetration and the greater the induced turbulence. These combine to decrease the duration of combustion and minimize flame extinction due to mid-cylinder flame quench. Thus, supersonic jet injection velocities are desired and such velocities cannot be attained via thermal expansion alone. Because thermal expansion dominates the jet ejection forces of the prior art described above, these prior plasma jet ignitors will not achieve the high velocity of the present invention. Additionally, the orifice configurations used in the prior art should be avoided because an orifice increases heat losses, introduces pressure losses, and decreases thermal efficiency. Also, it may be desirable to focus the plasma at some point in the combustion chamber and most often near the center of the combustion chamber. In this region, the air and fuel are well mixed and away from the cold chamber walls with their associative quenching effects. Further, this will decrease the duration of combustion. In addition, the plasma injection system should be durable.

The miniaturized railgun ignitor, or railplug, of the present invention operates on the principle of electromagnetics. Electromagnetic forces may be as much as 100 times larger than thermal expansion forces for a properly designed plasma injection system. Current flow is induced in electrodes or rails, creating an electromagnetic field in the railplug bore. The interaction of this field with the plasma current creates a $J \times B$ electromagnetic force (Lorentz force), which accelerates an arc down the railplug bore and projects it into the combustion chamber. Since the arc sweeps through the entire volume of the railplug bore, a much larger mass of plasma will be generated having higher energy than conventional plasma jet ignitors. The electromagnetic accelerating force causes the plasma to propagate down the railplug bore to achieve supersonic speeds at the muzzle exit. Depending upon the magnitude of the current and the bore dimensions, plasma propagation velocities between Mach 1.2 and Mach 10 can be achieved. Because thermal expansion augments but does not dominate the jet ejection forces, an orifice, found on conventional plasma jet ignitors, is neither required nor desired. Thus, a cavity need not be defined by the placement of an orifice on the combustion chamber side of the ignitor.

The present invention achieves the performance of an ideal ignitor through use of a novel configuration. In order to increase the plasma jet ejection velocity and thereby increase penetration depth and induce turbulence, the present invention has a large ratio of bore length to electrode spacing, or aspect ratio. By increasing this aspect ratio, the present invention can achieve supersonic jet ejection velocities, extend penetration depth to an optimum point in the combustion chamber, and induce more turbulence in the combustion chamber. An aspect ratio of at least 3:1 is desirable and at least about 6:1 is preferred. An aspect ratio of at least 10:1 is useful in some application. If a smaller chamber is encountered, the aspect ratio can easily be reduced to maintain optimum ignition.

Another feature of the present invention is the insulation of the electrodes from the outer casing along the entire bore length. If the electrodes were electrically connected to the mounting portion of the railplug between the plasma initiation point and the muzzle end, acceleration of a plasma by a self-generated Lorentz force would not occur because the electromagnetic forces acting on the plasma would be balanced. In the present invention, the conductor configurations result in equal currents flowing to and from the plasma from the plasma initiation end. This creates a higher magnetic field behind the plasma (closer to the plasma initiation end) and a very low magnetic field ahead of the plasma. This difference in magnetic field causes a "magnetic pressure," which accelerates the plasma through the bore between the conductors and into the combustion chamber.

For some applications, it may be preferred that the one of the electrodes be grounded. In such applications, for the reasons stated above, the grounding point must be located behind the plasma initiation point. Additionally, it is preferred that the distance between the grounding point of the grounded electrode and the plasma initiation point be at least equal to the diameter of the bore, and preferably two to three times that diameter.

In order to control the direction and shape of the plasma exiting the railplug bore, the present invention can use a coaxial bore configuration. The coaxial bore has an outer and inner electrode pair, the inner electrode being axially positioned so that the inner electrode is longer than, shorter than, or the same length as the outer annular electrode. If the inner electrode is up to one bore diameter shorter than the outer electrode, the plasma jet is focused and the plasma jet's tendency to immediately spread (due to thermodynamic effects) in a conical pattern is minimized. If the combustion chamber is fairly small, the inner electrode can be extended beyond the end of the outer electrode to enhance plasma hemispherical spreading. Thus, the aspect ratio and electrode configuration can be adjusted to maintain optimum ignition for various sizes of combustion chambers.

A square, rectangular, or round bore railplug configuration can also function to focus the plasma jet by decreasing the electrode spacing from the region of plasma initiation end to the muzzle end. By converging the electrodes such that the electrode spacing at the muzzle end is smaller than the spacing at the plasma-initiation end of the railplug, a more focused jet discharge pattern can be maintained deeper into the combustion chamber. Conversely, if a shallow penetration depth is desired, the electrodes can be situated in a diverging pattern such that the muzzle end is of larger dimension than the plasma-initiation end. By extending or retracting the inner electrode of a coaxial configuration, or by converging or diverging the electrodes of a square, rectangular, or round bore configuration, the plasma jet and its corresponding penetration depth can be adjusted to accommodate varying sizes and shapes of combustion chambers.

If desired, spin can be imparted to the plasma jet according to the present invention, by properly configuring the electrodes of the railplug, or by applying an external magnetic field to the railplug. More specifically, a coaxially configured railplug with the outer electrode having a helical shape, or a railplug with the electrodes forming a double helix, will impart spin to the exiting plasma jet. An energized solenoid surrounding the railplug will also impart spin to the exiting plasma jet.

Another variation on the parallel electrode pair configuration is an unenclosed railplug. The unenclosed railplug differs in that it has no sidewalls and the electrodes may protrude partially or fully into the combustion chamber. The advantage of this configuration is the elimination of sidewall tracking, which may prove to be a problem with the parallel geometry configuration. A further advantage is that possible manufacturing difficulties associated with the sidewalls are eliminated. An unenclosed railplug may also have advantageous electrode durability considerations, such as the ability to operate in both a standard sparkplug mode or a railplug mode. A partially enclosed railplug also has advantages similar to those of the unenclosed railplug, and may be especially well suited to indirect injection for cold starting diesel engines.

An additional alternative electrode configuration contemplated by the present invention is a three-electrode design. In one embodiment, an intermediate electrode is connected to a high voltage source that delivers a high voltage spark to initiate the plasma. This electrode is located between, and insulated from, a first and second electrode. After the plasma is initiated, the second electrode is connected to a low voltage source that delivers sufficient current to sustain the electromagnetic field and generate the Lorentz force to accelerate the plasma existing between the first and second electrodes down the bore and into the combustion chamber. The first electrode may be electrically connected to the casing, provided such connection point is behind the plasma initiation point. In an alternative three-electrode embodiment, the intermediate electrode is not connected to a voltage source, but its presence helps to stimulate a disturbance in the electrostatic field to induce plasma initiation.

So as to maintain the optimal jet ejection velocity, optimal jet shape, and optimal penetration depth, the present invention preferably uses an improved high energy power supply which ramps the current up from about 100 mA to initiate the plasma and which emits a peak current on the order of 1 kA. Peak currents as low as 200–300 A may be preferable in order to minimize electrode damage. By increasing the current, the $J \times B$ electromagnetic force is boosted such that the plasma jet is propelled at a velocity of 1 to 2 km/s or greater. Increased velocity will allow deeper plasma penetration before ignition occurs in the combustion chamber and will induce more turbulence in the combustion chamber. One improved power supply comprises a compulsator driven by an internal combustion engine crankshaft. The compulsator or compensated pulsed alternator, such as that disclosed in U.S. Pat. No. 4,200,831, the disclosure of which is incorporated herein by reference, includes a dedicated electromechanical generator which directly drives the railplugs with no high voltage switching a in conventional ignition system design.

Also contemplated by the present invention as a preferred power supply is an electronic ignition system which delivers an energy pulse to the railplugs timed with the rotation of the crankshaft.

The electromagnetic forces generated by the railplug of the present invention may be augmented by the use of additional conductor placed parallel and adjacent to the electrodes, or by positioning permanent magnets in the plug sidewalls.

The railplug of the present invention is more durable than known spark ignition devices because the arc does not dwell long in a single place on the electrodes. Durability can also be improved by coating portions of the electrodes with refractory, precious and/or noble metals, and by ramping the supply currents from a low to a high value.

Further objects, features, and advantages of the present invention will be apparent from the following detailed description when taken in conjunction with the accompanying drawings.

BRIEF DESCRIPTION OF THE DRAWINGS

FIG. 6 is a cross-sectional view of a coaxial electrode railplug with an additional solenoidal electromagnet according to the present invention.

FIG. 7 is a partial cross-sectional side view of a helical electrode railplug according to the present invention.

FIG. 8 is a cross-sectional view of a substantially parallel electrode railplug alternative embodiment plasma injector according to the present invention.

FIG. 8A is a cross-sectional view along plane 8A—8A of the muzzle end of the railplug of FIG. 8.

FIG. 9 is a cross-sectional view of a diverging electrode railplug alternative embodiment according to the present invention.

FIG. 9A is a cross-sectional view along plane 9A—9A of the muzzle end of the railplug of FIG. 9.

FIG. 10 is a cross-sectional view of a converging electrode railplug alternative embodiment according to the present invention.

FIG. 10A is a cross-sectional view along plane 10A—10A of the muzzle end of the railplug of FIG. 10.

FIG. 17 is a cross-sectional view of an alternative embodiment of a coaxial electrode railplug according to the present invention.

FIG. 17A is a cut away view of the outer electrode of the alternative embodiment represented in FIG. 17.

FIG. 18 is an alternative embodiment of the railplug of the present invention employing field windings to augment the electromagnetic field.

DESCRIPTION OF THE PREFERRED EMBODIMENTS

Figure 1:
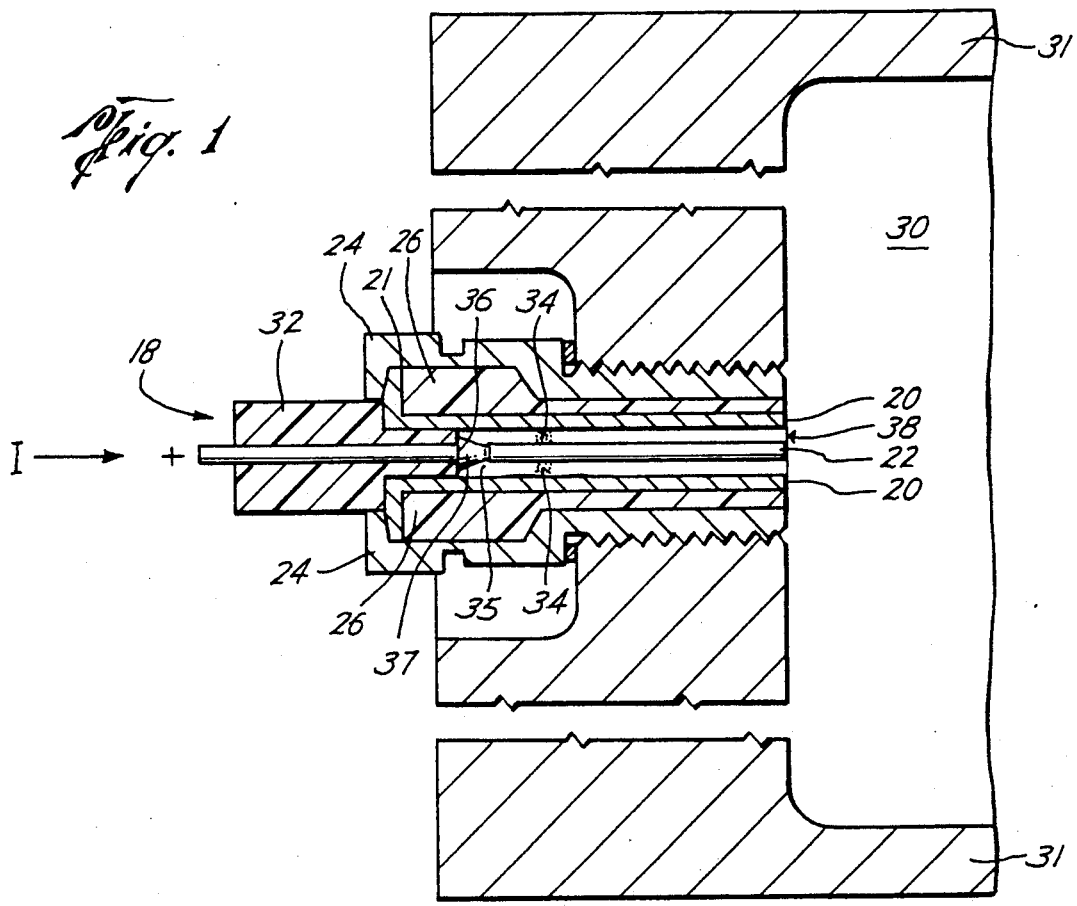
FIG. 1 is a cross-sectional view of a coaxial-electrode railplug according to the present invention.

FIG. 1 is a cross-sectional view of coaxial-bore railplug 18 of the present invention. Coaxial-bore railplug 18 comprises outer electrode 20 and inner electrode 22 placed substantially parallel to one another from plasma initiation end 36 to muzzle end 38. Outer electrode 20 is substantially cylindrical in shape and centered around a central axis traversing inner electrode 22. Outer and inner electrode 20 and 22, respectively, of railplug 18 are contained within holding plug 24 and surrounded by insulating sleeve 26. Sleeve 26 is substantially cylindrical in shape and electrically isolates outer electrode 20 from holding plug 24 in the vicinity of plasma initiation gap 35. Outer electrode 20 can be electrically connected (grounded) to holding plug 24 as long as plasma initiation end 36 is between connection 21 and muzzle end 38 of railplug 18.

It has been found that when the electrical connection 21 between outer electrode 20 and holding plug 24 is between plasma initiation end 36 and muzzle end 38, the Lorentz force due to the current flowing in outer electrode 20 will substantially cancel the Lorentz force due to the current flowing in inner electrode 22, thus resulting in little or no movement of arc 34 along electrodes 20 and 22 from plasma initiation end 36 to muzzle end 38 due to electromagnetic forces. For best results, it is preferred that the distance S (illustrated in FIG. 2) between plasma initiation end 36 and connection point 21 of outer electrode 20 be at least as great as the diameter D of bore 40, and preferably two to three times that diameter.

Additionally, it has been determined that, absent insulation of the electrodes along bore 40 between plasma initiation point 36 and muzzle end 38, the Lorentz force will be substantially cancelled unless the electrodes are extended into the chamber 30. The present invention provides insulation between plasma initiation point 36 and muzzle end 38, thus allowing electrodes 20 and 22 to terminate flush at muzzle end 3 without disturbing the Lorentz force.

Railplug 18, contained within holding plug 24, is designed to be inserted into combustion chamber 30. Like a standard spark plug, holding plug 24 can be threaded into cylinder head 31. Other suitable mechanical connections can also be used. Once in place, holding plug 24 provides an interface between railplug 18 and combustion chamber 30. Combustion chamber 30 can be any chamber in which a combustible mixture or medium resides, and for which ignition of that mixture or medium can take place. Combustion chamber 30 can be either an internal combustion engine or a continuous combustion system. The combustible mixture or medium can be, for example, an air-fuel mixture, a lean-fuel mixture, a solid or liquid propellant, or any other combustible material or mixture of materials.

Contained between the inner electrode 22 and outer electrode 20 is an insulating ring 32, which maintains spacing between inner and outer electrodes 22 and 20. Ring 32 is made of rigid, non-conductive material having inner and outer surfaces to which a portion of inner and outer electrodes 22 and 20, respectively, are connected. In order to establish an electromagnetic field, a current path 1 is shown in FIG. 1 as entering inner electrode 22. A pulsed current source (not shown in FIG. 1) is coupled to railplug 18 and provides the necessary current. Outer electrode 20 is electrically connected to the holding plug at point 21. In order to complete the current path, arc 34 forms between outer and inner electrodes 20 and 22. During each current pulse cycle, arc 34 begins at initiation end 36 and travels towards muzzle end 38 of railplug 18.

Plasma initiation gap 35 is formed at plasma initiation end 36 of railplug 18 between conductive protrusions 37 and outer electrode 20. Protrusions 37 are formed integrally with or conductively coupled to inner electrode 22. Other structures for plasma initiation gap 35 are also acceptable as long as they function to ensure arc initiation at initiation end 36.

Because railplug 18 distributes electrical energy over a large surface area and because arc 34 accelerates down the inner and outer electrodes leaving little time available for electrode erosion, railplugs 18 should not exhibit electrode erosion except near initiation end 36. Low currents can be used to initiate arc 34 to minimize electrode erosion. Following the establishment of the arc using low current, the current can be ramped up to higher levels to accelerate the arc since there is little time or driving force for electrode erosion as the arc accelerates down the rails. Further, both outer and inner electrodes 20 and 22 can be coated with or made from a noble, precious, or refractory metal extending a length of approximately 1-10 bore diameters from the plasma initiation end 36. Acceptable metals for this purpose include, for example, platinum, rhodium, tungsten, and molybdenum.

Figure 2:
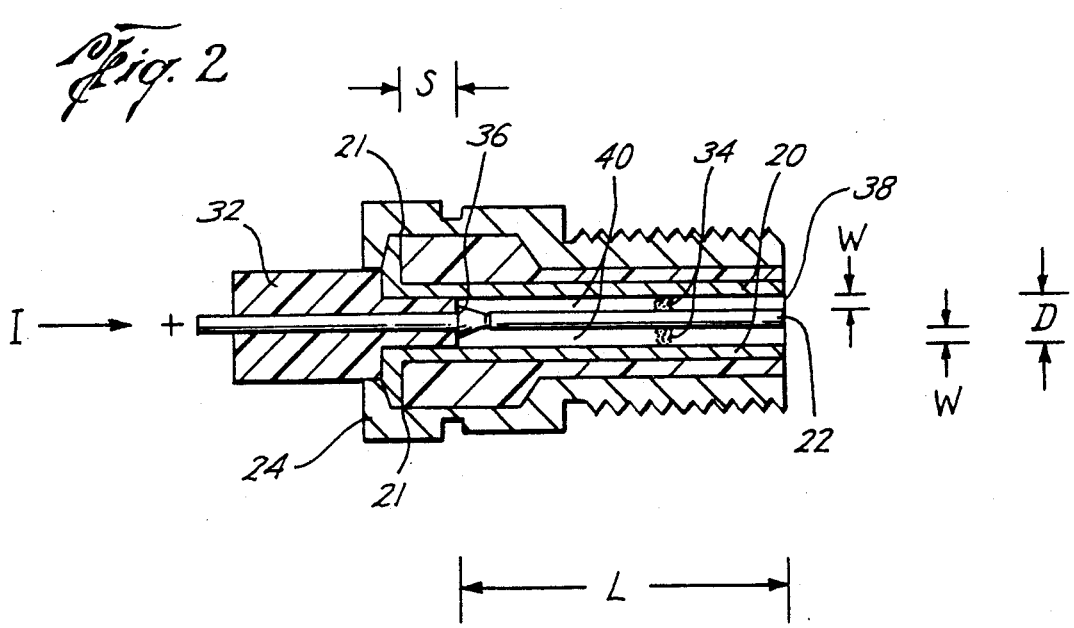
FIG. 2 is a cross-sectional view of plasma acceleration along the coaxial electrode railplug of FIG. 1.

As shown in FIG. 2, the plasma is accelerated by electromagnetic force created by pulsed current flowing through inner electrode 22. The resulting plasma jet is generally unidirectional as it travels down the length L of bore 40 from the plasma initiation end 36 toward muzzle end 38 and is injected into combustion chamber 30. As the arc 34 travels down length L of bore 40, it ionizes essentially all of the gas in the muzzle. Contained within combustion chamber 30 is a mixture of air and fuel, which ignites upon injection of the high energy plasma. The plasma entering combustion chamber 30 reaches muzzle exit velocities that are greater than the speed of sound and certainly greater than the velocity that can be achieved by thermal expansion alone.

Figure 3:
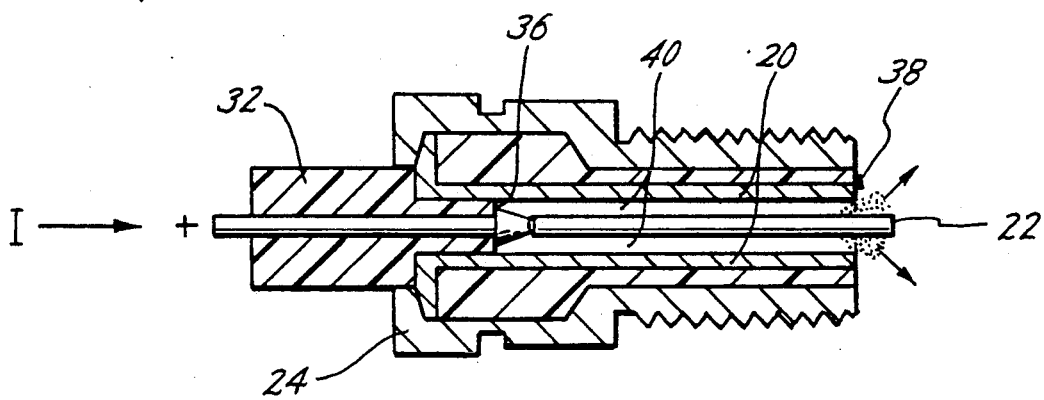
FIG. 3 is a cross-sectional view of a coaxial electrode railplug with a long inner electrode alternative embodiment.
Figure 4:
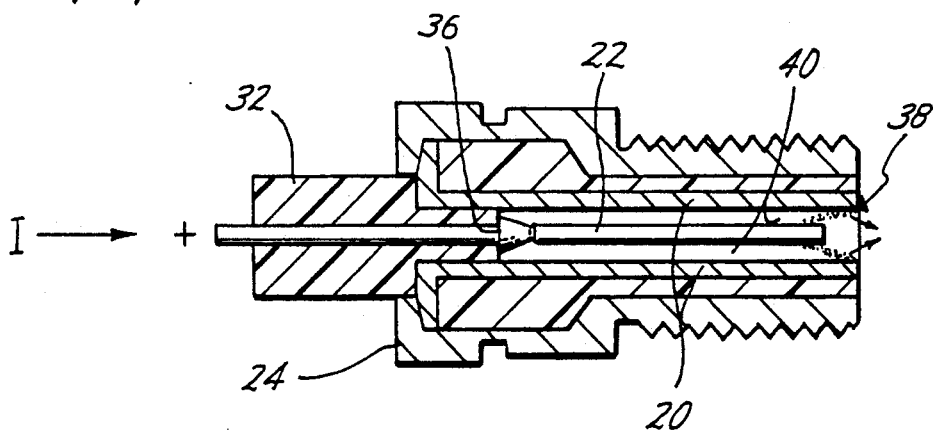
FIG. 4 is a cross-sectional view of a coaxial electrode railplug with a short inner electrode alternative embodiment.

The penetration depth of the plasma as it extends from muzzle end 38 and into combustion chamber 30 is controlled by several factors. First, by increasing length L of the bore 40 in proportion to spacing W between electrodes 20 and 22, the plasma jet velocity can be increased, which will increase penetration and induce more turbulence within chamber 30. According to the present invention, the aspect ratio, which is defined herein as the ratio of bore length L to electrode spacing W, is at least 3:1, and is preferably on the order of at least 6:1. Aspect ratios of at least 10:1 have also proven useful in certain applications. By regulating bore geometry (either borelength L or electrode spacing W), plasma can be directed to a point near the middle of combustion chamber 30. A shallow penetration of plasma can occur by extending muzzle end 38 of inner electrode 22 as shown in FIG. 3. Conversely, a deeper penetration depth is achieved by retracting muzzle end 38 of inner electrode 22 as shown in FIG. 4. If plasma jet dispersion is desirable for a given combustion chamber 30, railplug 18 can be modified such that inner electrode 22 is extended beyond muzzle end 38 of outer electrode 20. By extending inner electrode 22 beyond muzzle end 38, plasma will have a tendency immediately to spread at the point at which it exits muzzle end 38. Thus, the spreading plasma of extended inner electrode 22 shown in FIG. 3 will spread more rapidly within chamber 30 than if the shorter inner electrode 22 of FIG. 4 is used. If a shorter inner electrode 22 is used, then the plasma is directed inward, thereby allowing a deeper penetration of a focused plasma before plasma dispersion occurs within chamber 30.

Figure 5:
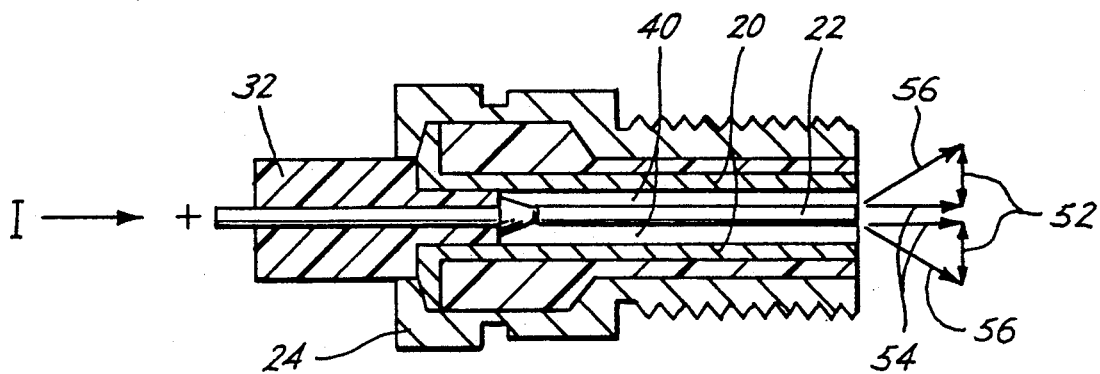
FIG. 5 is a cross-sectional view of plasma being propelled from the muzzle and of the coaxial electrode railplug of FIG. 1.

FIG. 5 illustrates inner electrode 22 terminating flush with outer electrode 20. This results in an intermediate depth of plasma jet penetration between those shown in FIGS. 3 and 4. By setting inner electrode length 22 to be flush with outer electrode 20, the plasma jet will optimally penetrate to an intermediate depth necessary to accommodate combustion chamber 30 of intermediate dimensions.

As is readily apparent from FIGS. 3, 4 and 5, inner electrode 22 can be designed such that its length is extended or retracted to accommodate combustion chambers 30 of different dimensions, geometries or shapes, so as to produce the desired optimal effects of the plasma jet. Inner electrode 22 is preferably lengthened or shortened by a distance of up to one bore diameter D from the established bore length L.

One of the various ways in which forced ignition is achieved is to direct or focus the plasma jet exiting muzzle end 38. FIG. 5 also illustrates three velocity vectors attributable to the exiting plasma jet stream. Directed (kinetic) velocity vector 54 is shown as extending along the central axis of railplug 18. Directed velocity 54 is the velocity vector of the plasma caused solely by electromagnetic force within railplug 18. However, random (thermal) velocity 52 is caused by natural thermal expansion of the plasma as it exits muzzle end 38. If the exiting plasma is directed by thermal expansion forces, more so than by electromagnetic forces, then resultant velocity 56 would be at a more severe angle from the central axis causing a more immediate spread of exiting plasma. However, even if a combustible mixture is ignited within railplug 18, the electromagnetic forces occurring in the railplug of the present invention will still dominate the thermal ejection forces. Therefore, random velocity 52 is small in comparison to directed velocity 54. Resultant velocity vector 56 is therefore focused more toward the center of combustion chamber 30 than ignitors that use a combination of both thermal expansion force and electromagnetic force.

A spinning motion can be added to the exiting plasma by varying the configuration of railplug 18. FIG. 6 illustrates a cross-sectional side view of one such variation, wherein a solenoidal electromagnet 46 surrounds outer electrode 20, which may be electrically connected to the holding plug (not shown in FIG. 6). Solenoidal electromagnet 46 receives current in series with inner electrode 22 such that an additional electromagnetic field is exerted upon the plasma. By imparting a spin to the exiting plasma, a more efficient ignition can be achieved which minimizes quenching effects associated with cold combustion chamber 30 walls. Thus, one of the advantages in adding turbulence to the contents of combustion chamber 30 by spinning the plasma is to aid ignition and thereby allowing ignition at colder operating temperatures.

Plasma spin can also be achieved by the helical rail configuration shown in FIG. 7. Instead of bore 40 being coaxial, the helical configuration has a substantially cylindrical bore defined by a pair of helically arranged electrodes 48 and 50. Electrode 50 is connected to a pulsed power supply and the electrodes are electrically isolated from each other. Electrode 48 may be electrically connected to holding plug 24. Plasma accelerates between electrodes 48 and 50 from initiation end 36 to muzzle end 38. As the plasma moves between the electrodes, it forms a swirling or spiral path which extends beyond the muzzle end 38 and into combustion chamber 30. The aspect ratio (ratio of bore length L to bore width W) is at least 3:1 and is preferably on the order of about 6:1. A ratio of at least 10:1 can also be effective in certain applications. Further, it is preferred that the distance S between connection point 21 of electrode 48 and plasma initiation point 36 be at least equal to diameter D of bore 40, and preferably two to three times that diameter.

Plasma spin may also be created by a railplug having a coaxial configuration with a straight inner electrode and a helical outer electrode.

Although turbulence aids ignition in certain types of engines, such as diesels, it is not necessary that the present invention induce turbulence in order to achieve its desired result. Railplug 18 can induce ignition without turbulence. Based solely on electromagnetic force, ignition can be achieved in adverse environments and prove useful as replacement for glow plugs in indirect injection diesel engines, conventional ignitors in gas turbines, and so forth. Diesel engines having high compression ratios of 21:1 to 23:1 are used to provide sufficient hot air at the end of the compression process to allow auto ignition of the fuel/air mixture. However, even these high compression ratios are insufficient to provide cold start when temperatures drop below zero to 10° C. Glow plugs are used to allow starting at colder temperatures, but are effective down to only about −5° C. to −15° C. The present invention replaces glow plugs with railplugs 18 that force ignition at temperatures below −15° C. Unlike conventional diesel engines using glow plugs, once the railplug 18 of the present invention starts the diesel engine, very little smoke and carbon monoxide are admitted into the environment during cold starts.

FIG. 8 is an alternative embodiment of the present invention having a dual-rail railplug 18A. Dual-rail railplug 18A comprises a pair of electrodes 20A and 22A, which are substantially parallel along bore length L. The spacing W between the pair of electrodes 20A and 22A defines initiation gap 35A formed by protrusions 37A at bore 40A through which plasma is accelerated from initiation end 36A to the muzzle end 38A. The plasma jet is accelerated unidirectionally down bore 40A by an electromagnetic force created by pulsed current conductively coupled to electrode 20A. The plasma jet is accelerated from initiation gap 35A, i.e. at plasma initiation end 36A, and accelerates down bore 40A until the plasma partially detaches from muzzle end 38A and initiates combustion. Once again, according to the present invention, the aspect ratio is at least 3:1 and is preferably the order of about 6:1. A ratio of at least 10:1 can also be effective in certain applications. Further, it is preferred that the distance S between connection point 21A of electrode 22A and plasma initiation point 36a be at least equal to the diameter of bore 40A, which is equal to W, and preferably two to three times that value.

FIG. 8A is a cross-sectional view along plane 8A—8A of the railplug of FIG. 8. As shown in FIG. 8A, the cross-sections of electrodes 20A and 22A are circular in shape.

FIG. 9 is a cross-sectional view of another alternative embodiment dual-rail plasma ignitor 18B having diverging electrodes 20B and 22B. Electrodes 20B and 22B diverge outward from initiation end 36B to muzzle end 38B. The spacing W, between electrodes 20B and 22B at muzzle end 38B, is larger than the muzzle end 38A of parallel electrodes 20A and 22A illustrated in FIG. 8. The larger muzzle dimension allows exiting plasma to exit in a diverging pattern, resulting in a decrease in penetration depth to accommodate a smaller combustion chamber. The magnitude of outward angle 51 can be varied and is preferably 0.5 to 10 degrees. Diverging electrodes 20B and 22B also eliminate the need for protrusions at plasma initiation end 36B. If the outward angle 51 is increased, the width W of muzzle end 38A will be increased, resulting in a less focused, shallower plasma penetration depth. Once again, the aspect ratio of ignitor 18B is at least 3:1 and is preferably on the order of at least 6:1 or at least 10:1. Further, it is preferred that the distance S be at least equal to W, and preferably two to three times W.

FIG. 9A is a cross-sectional view along plane 9A—9A of the railplug 18B of FIG. 9, illustrating the rectangular shape of the bore at muzzle end 38B.

FIG. 10 illustrates a cross-sectional view of another alternative embodiment dual-rail plasma ignitor 18C having converging, substantially rectangular electrodes 20C and 22C. The electrodes 20C and 22C converge inward from initiation gap 35C at initiation end 36C to muzzle end 38C. The spacing W between electrodes 20C and 22C at muzzle end 38C is smaller than that of parallel electrodes 20A and 22A at the muzzle end 38A illustrated in FIG. 8. The smaller exit end dimension allows exiting plasma to focus inward, resulting in an increase in penetration depth to accommodate larger combustion chambers. The magnitude of inward angle 53 can be varied and is preferably 0.5 to 10 degrees. If inward angle 53 is increased, the width W of muzzle end 38C will be reduced, resulting in more focused and deeper plasma penetration depth. Aspect ratio remains at least 3:1 and preferably on the order at least of 6:1 or 10:1. The preferred ratio of S to W remains at least 1:1, and is preferably 2:1 or 3:1.

FIG. 10A is a cross-sectional view along plane 10A—10A of railplug 18c of FIG. 10, and illustrates the rectangular shape of bore 40C.

The coaxial railplug configurations of FIGS. 1–6, and the helical electrode configuration of FIG. 7 can also be modified to incorporate converging or diverging electrodes with plasma focussing or spreading effects.

Another way of controlling the plasma penetration depth is to increase the plasma acceleration force throughout the length of bore 40. Increasing the plasma force will result in an increased plasma velocity, thereby extending the plasma penetration depth into combustion chamber 30. One means for increasing the plasma acceleration force is by increasing the output of an applied current or voltage supply 42 (See FIG. 11).

Figure 11:
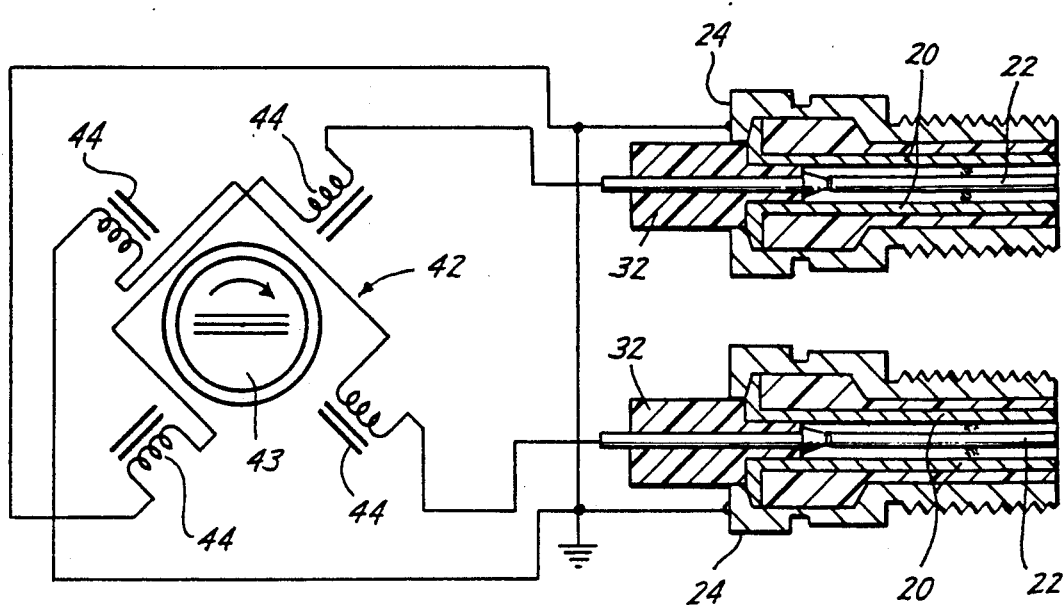
FIG. 11 is a high energy power supply illustrating a two-cylinder engine embodiment of the present invention.

The present invention includes a high energy power supply 42 shown in FIG. 11 which can apply a small current to initiate the plasma and then ramp up to a larger peak current pulse between inner and outer electrodes 22 and 20, respectively. Higher electrode currents translate to an increase in $J \times B$ or electromagnetic force used to drive the plasma down bore 24 and into combustion chamber 30. Pole pairs 44 of the high energy power supply 40 are attached to inner and outer electrodes 22 and 20 at a point removed from bore region 40 at points 39 and 41, which are separated by insulating ring 32. FIG. 11 shows high energy power supply 42 for a two-cylinder embodiment. The high energy supply 42 includes a compensated pulsed alternator or compulsator 40 driven directly from a standard internal combustion engine crankshaft. Indirect driving would also be acceptable. Illustrated is a two-pole electromagnetic or permanent magnetic rotor 43 operating in a multiple pole stator to directly drive railplugs 18 for a multi-cylinder engine with no high-voltage switching. The number of pole pairs is equal to the number of railplugs 18 used. Railplugs 18 of the present invention can require peak current on the order of 1,000 amperes.

Figure 12:
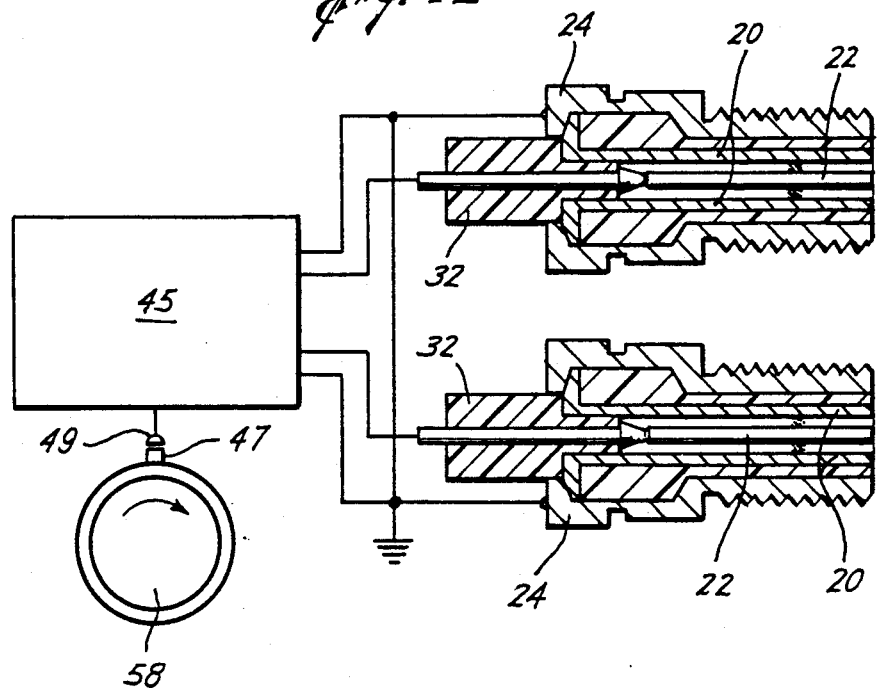
FIG. 12 is an electronic ignition power supply illustrating a two-cylinder embodiment of the present invention.

The present invention also includes an electronic ignition power supply 45 shown in FIG. 12 which can cyclically generate current to initiate the plasma between inner and outer electrodes 22 and 20, respectively. Illustrated schematically by way of example is an electronic ignition 45 that is connected to reed switch 47, which provides timing signals from crankshaft 58 by magnet 49. Rotation of crankshaft 58 accordingly delivers a timed, pulsed current to each railplug 18. Alternatively, any power supply capable of delivering pulsed signals may be used.

Figure 13:
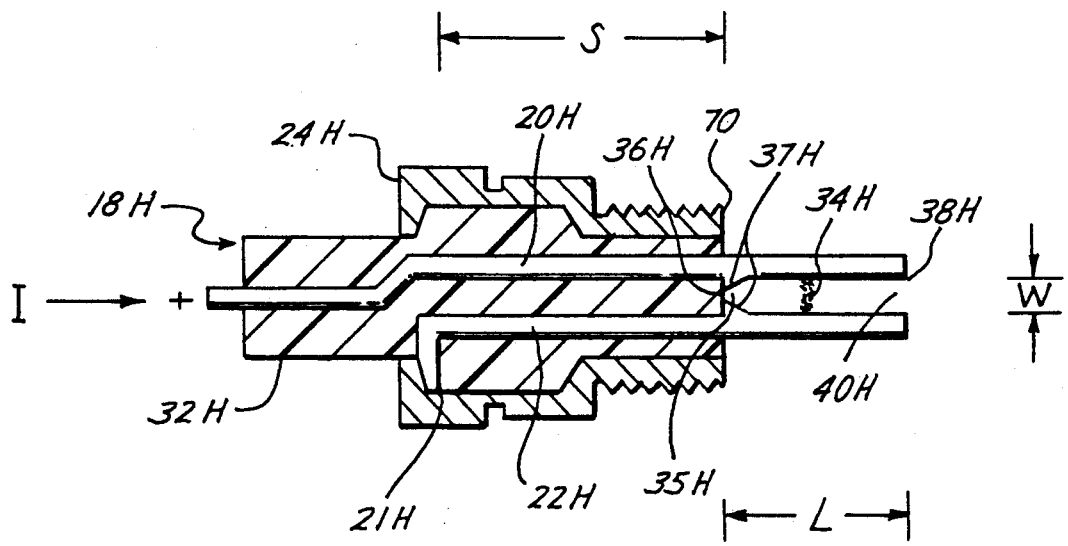
FIG. 13 is a cross-sectional view of an unenclosed railplug alternative embodiment according to the present invention.

FIG. 13 is an alternative embodiment of the present invention having an unenclosed dual-rail railplug 18H. Dual-rail railplug 18H comprises a pair of electrodes 20H and 22H, which are substantially parallel. The spacing W between the pair of electrodes 20H and 22H defines initiation gap 35H formed by protrusions 37H through which plasma is accelerated from initiation end 36H along electrodes 20H and 22H into the combustion chamber. The plasma jet is accelerated unidirectionally between electrodes 20H and 22H by an electromagnetic force created by pulsed current conductively coupled to electrode 20H. The plasma jet is accelerated from initiation gap 35H, i.e. at plasma initiation end 36H, and accelerates down bore 40H until the plasma detaches from muzzle end 38H and initiates combustion. Once again, according to the present invention, the aspect ratio is at least 3:1 and is preferably on the order of about 6:1. A of at least 10:1 can also be effective in certain applications. Further, it is preferred that the distance S between connection point 21H of electrode 22H and plasma initiation point 36H be at least equal to W, and is preferably two to three times that value. Unenclosed railplug 18H may have advantageous electrode durability considerations, such as the ability to operate in both a standard sparkplug mode or a railplug mode. Although plasma initiation point 36H is shown in FIG. 13 adjacent open end 70 of holding plug 24H, plasma initiation point 36H may lie anywhere between opening 70 and muzzle end 38H.

Figure 14:
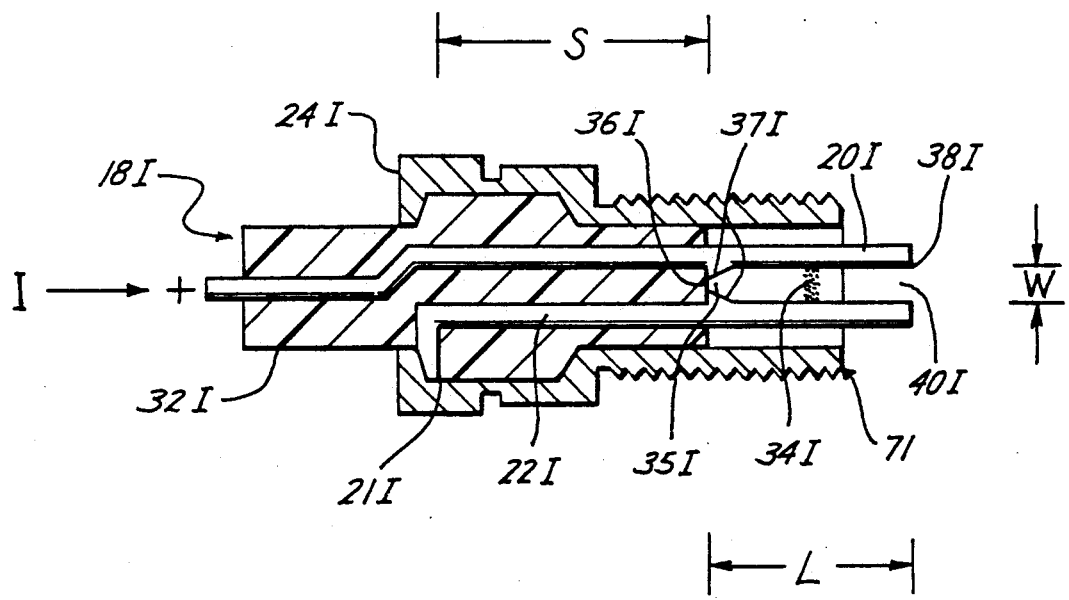
FIG. 14 is a cross-sectional view of a partially enclosed railplug alternative embodiment according to the present invention.

A partially enclosed railplug also has advantages similar to those of the unenclosed railplug, and may be especially well suited to indirect injection for cold starting diesel engines. FIG. 14 illustrates partially enclosed dual-rail railplug 18I, which comprises substantially parallel electrode pair 20I and 22I. The spacing W between the pair of electrodes 20I and 22I defines initiation gap 35I formed by protrusions 37I through which plasma is accelerated from initiation end 36I along electrodes 20I and 22I into the combustion chamber. The plasma jet is accelerated unidirectionally between electrodes 20I and 22I by an electromagnetic force created by pulsed current conductively coupled to electrode 20I. The plasma jet is accelerated from initiation gap 35I, i.e. at plasma initiation end 36I, and accelerates down bore 40I until the plasma detaches from muzzle end 38I and initiates combustion. Once again, according to the present invention, the aspect ratio is at least 3:1 and is preferably on the order of about 6:1. A ratio of at least 10:1 can also be effective in certain applications. Further, it is preferred that the distance S between connection point 21I of electrode 22I and plasma initiation point 36I be at least equal to W, and is preferably two to three times that value. As can be seen with reference to FIG. 14, opening 71 of holding plug 24I lies between plasma initiation end 36I and muzzle end 38I of bore 40I.

Figure 15:
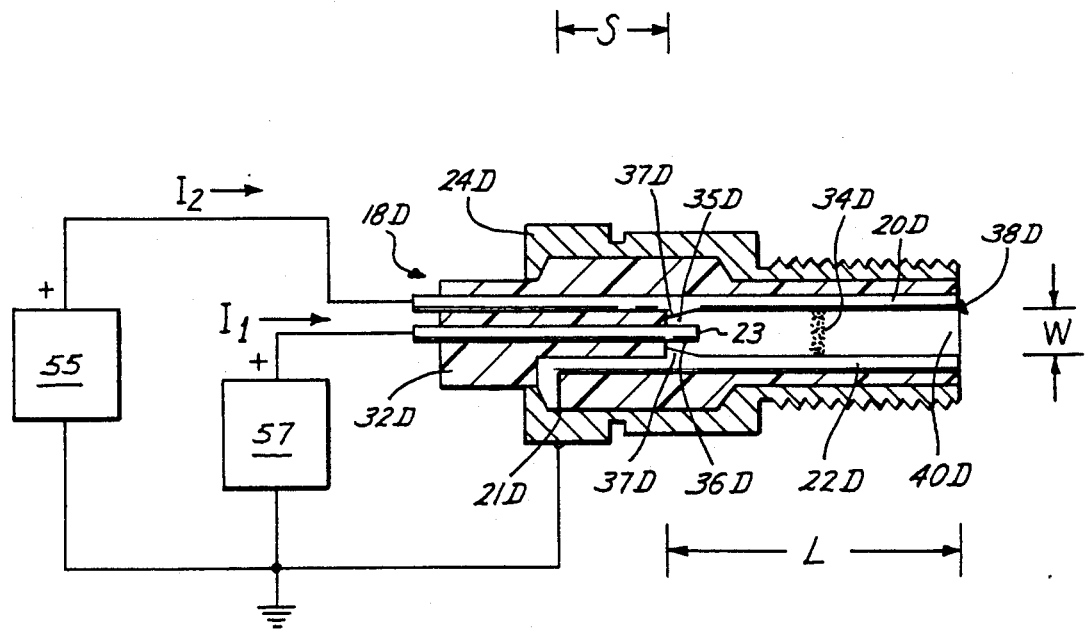
FIG. 15 is a cross-sectional view of a railplug alternative embodiment with an active third electrode according to the present invention, also illustrating connections to high and low voltage power sources.

FIG. 15 is a cross-sectional view of a railplug alternative embodiment with an active third electrode according to the present invention, also illustrating connections to high and low voltage power sources. Three-electrode railplug 18D comprises an active electrode 20D, intermediate electrode 23, and a grounded electrode 22D. The spacing W between electrodes 20D and 22D defines initiation gap 35D into which electrode 23 partially extends between protrusions 37D. The plasma jet is primed by a pulsed spark generated by high voltage source 57 that is conductively coupled to electrode 23. Once the plasma is initiated, the resistivity of the plasma is lowered, and the electromagnetic force may be sustained by pulsed current conductively coupled to electrode 20D. The plasma jet is accelerated from initiation gap 35D, i.e. at plasma initiation end 36D, and accelerates down bore 40D until the plasma partially detaches from muzzle end 38D and initiates combustion. Once again, according to the present invention, the aspect ratio (ratio of bore length L to bore width W) is at least 3:1 and is preferably on the order of about 6:1. A ratio of at least 10:1 can also be effective in certain applications. Further, it is preferred that the distance S between plasma initiation end 36D and connection point 21D of electrode 20D be at least as great as W, and preferably two to three times W.

The pulsed initiation spark from high voltage source 57 is repeated as often as is necessary for the particular application. For example, in an internal combustion engine, the spark from high voltage source 57 will be generated cyclically as necessary to drive the crankshaft. However, in diesel applications, the high voltage spark may be necessary only upon initially starting the engine.

Figure 16:
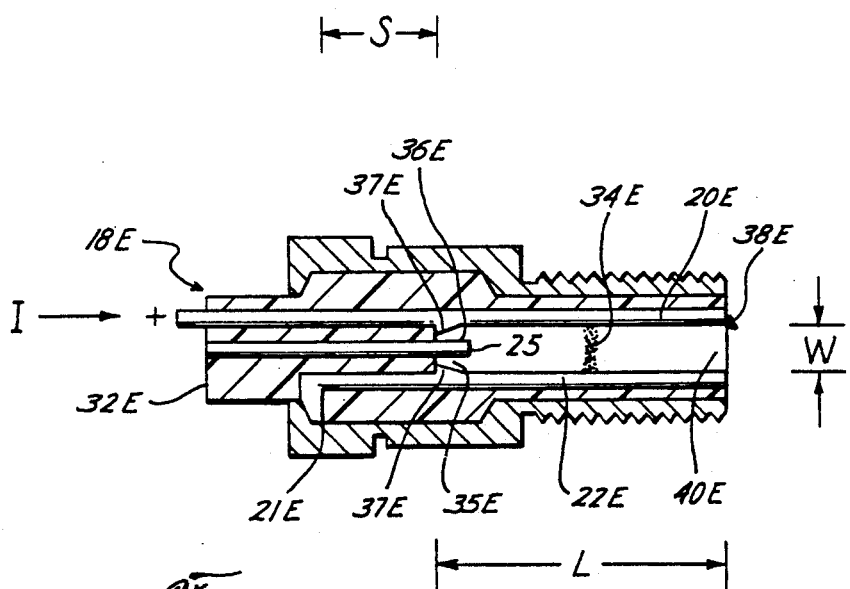
FIG. 16 is a cross-sectional view of a railplug alternative embodiment with a passive third electrode according to the present invention.

The three-rail embodiment may also be used with a passive third electrode, as illustrated in FIG. 16. Three-electrode plasma ignitor 18E comprises active electrode 20E, passive electrode 25 and grounded electrode 22E. Passive electrode 25 is insulated from electrodes 20E and 22E. The spacing W between electrodes 20E and 22E defines initiation gap 35E formed by protrusions 37E into which passive electrode 25 partially extends. The plasma jet is initiated at plasma initiation end 36E by current conducted through electrode 20E. Passive electrode 25 stimulates plasma initiation by creating a disturbance in the electrostatic field. Once initiated, the plasma accelerates down bore 40E until the plasma partially detaches from muzzle end 38E and initiates combustion. Once again, according to the present invention, the aspect ratio (ratio of bore length L to bore width W) is at least 3:1 and is preferably on the order of about 6:1. A ratio of at least 10:1 can also be effective in certain applications. Further, it is preferred that the distance S between plasma initiation end 36E and connection point 21E of electrode 20E be at least as great as W, and preferably two to three times W.

FIG. 17 is a cross-sectional view of an alternative embodiment of a railplug according to the present invention. Coaxial railplug 18F comprises outer electrode 20F and inner electrode 22F placed substantially parallel to each other in the bore region from the plasma initiation point 35F to muzzle end 38F. Outer electrode 20F, illustrated in greater detail in FIG. 17A, is substantially cylindrical in shape and centered around a central axis traversing inner electrode 22F. In the bore region between plasma initiation point 35F and muzzle end 38F, the electrodes are insulated from each other by air gap 65. Outer electrode 22F is insulated from holding plug 24F from muzzle end 38F to connection point 66 by air gap 61. It is preferred that the distance S from connection point 66 and plasma initiation point 36F be at least equal to diameter D of bore 40F, and preferably two to three times that diameter.

Sleeve 26F is substantially cylindrical in shape and electrically isolates inner electrode 22F, which is connected to conductive rod 62, from holding plug 24F. Bushing 64 is threaded into holding plug 24F to retain sleeve 26F. Conductive cap 60 is threaded into sleeve 26F, and is electrically connected to conductive rod 62, and thereby to inner electrode 22F. Other suitable mechanical connections between bushing 64 and holding plug 24F, and also between conductive cap 60 and sleeve 26F, may also be used.

Railplug 18F, contained within holding plug 24F, is designed to be inserted into a combustion chamber (not shown in FIG. 17). Like a standard spark plug, holding plug 24F can be threaded into a cylinder head. Additionally, other suitable mechanical connections can be used. Once in place, holding plug 24F provides an interface between railplug 18F and the combustion chamber, which can be any chamber in which a combustible mixture or medium resides, and for which ignition of that mixture or medium can take place.

Plasma initiation gap 35F is formed at plasma initiation end 36F of railplug 18F between protrusion 63, which is formed integrally with outer electrode 20F. The spacing W between outer electrode 20F and inner electrode 22F is approximately equal to the radius of bore 40F, through which the plasma is accelerated from initiation end 36F to muzzle end 38F. The plasma is accelerated by electromagnetic force created by pulsed current flowing into conductive cap 60, through conductive rod 62 and into inner electrode 22F. The resulting plasma jet is generally unidirectional as it travels down the length of bore 40F toward muzzle end 38F into a combustion chamber (not shown in FIG. 17). The aspect ratio (the ratio of bore length L to electrode spacing W) is at least 3:1, and is preferably on the order of at least 6:1. Aspect ratios of at least 10:1 have also proven useful in certain applications. As in the other embodiments of the railplug of the present invention, the exit velocity of the plasma is greater than the speed of sound, and certainly greater than the velocity that can be achieved by thermal expansion alone.

The electromagnetic field generated by the dual electrode railplug of the present invention may be augmented as illustrated in FIG. 18. Electrode 20G is connected to a voltage source and receives current as shown. Field windings originate from electrode 22G and are placed parallel with and adjacent to electrodes 20G and 22G. The field windings augment the strength of the electromagnetic field generated by the current flowing through the electrodes 20G and 22G. This increases the electromagnetic force by which arc 34G is accelerated through bore 40G toward muzzle end 38G and into a combustion chamber (not shown in FIG. 18). Although two field windings are shown in FIG. 18, one or more windings can be used.

The present invention provides easier ignition under adverse conditions, such as fuel-lean mixtures, low mixture temperatures, and low mixture densities. Via the various designs of the railplug and/or by increasing the electromagnetic forces applied to plasma within bore 40, the present invention is capable of increasing plasma penetration away from the quenching, cold combustion chamber 30 side walls. Not only does this promote ignition, but for certain applications, such as the homogeneous charge spark ignition engine, it decreases the duration of combustion and thus provide higher thermal efficiency, while for other applications for which the fuel and oxidant are admitted separately, such as diesels and gas turbines, the ability to fire a plasma across the combustion chamber allows ignition even when there is not a combustible mixture in the immediate vicinity of the ignitor. For still other applications, such as the 2-stroke and the lean-burn 4-stroke spark ignition engines, the high energy of the plasma together with the fact the ignition is moved away from the cold walls enhances ignition. The high energy of the plasma proves advantageous for even other applications, such as when used by an ignitor for solid propellants. Further, the turbulence induced by the high velocity of the plasma jet generated by railplugs 18 is advantageous. For example, for the homogeneous charge spark ignition engine, the increased turbulence increases the rate of combustion and thus further increases the thermal efficiency of the engine while also decreasing the knock tendency and fuel sensitivity of the engine. As another example, for diesels and direct injection spark engines, the increased turbulence aids atomization of the fuel and/or increases the mixing of the fuel and oxidant and thus further enhances ignition. Further, the railplug can be designed (either through mechanical configuration or by addition of a cooling jacket) to maintain a relatively low temperature although it produces a hot ignition. This would be advantageous for alcohol-fueled spark ignition engines. This fact, together with the fact that the high temperature of the plasma will self-clean the rails, will overcome present ignitor problems of dual-fueled spark ignition engines. Therefore, replacement of present ignition systems with railplug systems will result in improved engine performance without the need to alter any of the other mechanical components. However, in order to take maximum advantage of the railplug system, engines may require redesign as far as location and orientation of the railplugs relative to placement of the conventional ignitors. Further, the availability of the railplug system will allow development of engines that currently are obstructed by ignition-related problems, such as the lean-burn spark ignition engine and the dual-fuel spark ignition engine.

In comparison to prior ignitors, railplugs are dominated by electromagnetic forces and the arc sweeps through a large volume. The high electromagnetic force is produced by use of a high aspect ratio, and essentially constant plasma surface area throughout the travel of the arc through the muzzle, and, preferably, an increasing current as the arc accelerates along the rails. An orifice separating the ignitor from the combustion chamber is neither required nor desired. Thus, railplugs produce a larger mass of plasma and a higher plasma velocity, resulting in a higher energy plasma, greater plasma penetration, and greater inducement of turbulence. Further, the unique design of the railplugs overcomes the durability problems associated with prior art ignitors.

The present invention has been disclosed in connection with specific embodiments. However, it will be apparent to those skilled in the art that variations from the illustrated embodiments may be undertaken without departing from the spirit and scope of the invention. Additionally, any type of augmented rail structure that can provide spinning or turbulent plasma flow beyond the solenoidal electromagnet or helical rails may be used. Furthermore, the point in which railplug 18 enters combustion chamber 30 can be varied such that railplug 18 can enter a hole placed in substantially any wall section of combustion chamber 30. These and other variations will be apparent to those skilled in the art and are within the spirit and scope of the invention.

What is claimed:

1. A railgun ignition device for generating and injecting a high energy plasma jet into a combustion chamber, comprising:
   a holding plug including means for mounting said railgun ignition device in a utilization apparatus;
   first and second spaced part electrodes extending along a central axis and defining a bore having a muzzle end and a plasma initiation end, said first electrode being electrically insulated from said holding plug, said bore having a width equal to a spacing between said first and second electrodes at said muzzle end and a length equal to a distance between said muzzle end and said plasma initiation end, an aspect ratio of said bore being at least 3:1; and
   an electrical connection between said second electrode and said holding plug, said plasma initiation end being between said electrical connection and said muzzle end.

2. The railgun ignition device of claim 1, said aspect ratio being at least 6:1.

3. The railgun ignition device of claim 2, said aspect ratio being at least 10:1.

4. The railgun ignition device of claim 1, said first and second electrodes being coated with a metal extending for a distance of from 1 to 10 bore widths along said electrodes from said plasma initiation end, said metal being selected from the group consisting of refractory metal, noble metal and precious metal.

5. The railgun ignition device of claim 1, said first and second electrodes extending substantially parallel to each other along said central axis.

6. The railgun ignition device of claim 1, said first and second electrodes converging towards each other from said plasma initiation end to said muzzle end at an angle in the range of 0.5 to 10 degrees.

7. The railgun ignition device of claim 1, said first and second electrodes diverging away from each other from said plasma initiation and to said muzzle end at an angle in the range of 0.5 to 10 degrees.

8. The railgun ignition device of claim 1, said first and second electrodes being coaxial.

9. The railgun ignition device of claim 8, said first and second electrodes being of different lengths.

10. The railgun ignition device of claim 9, said first electrode being an inner electrode and said second electrode being an outer electrode, said inner electrode being shorter than said outer electrode.

11. The railgun ignition device of claim 10, a length of said inner electrode being substantially equal to a length of said outer electrode less said bore width.

12. The railgun ignition device of claim 9, said first electrode being an inner electrode and said second electrode being an outer electrode, said inner electrode being longer than said outer electrode.

13. The railgun ignition device of claim 12, a length of said inner electrode being substantially equal to a length of said outer electrode plus said bore width.

14. The railgun ignition device of claim 8, said first and second electrodes extending substantially parallel to each other along said central axis.

15. The railgun ignition device of claim 8, said first and second electrodes converging toward each other from said plasma initiation and to said muzzle end at an angle in the range of 0.5 to 10 degrees.

16. The railgun ignition device of claim 8, said first and second electrodes diverging away from each other from said plasma initiation and to said muzzle end at an angle in the range of 0.5 to 10 degrees.

17. The railgun ignition device of claim 1, further comprising means for spinning said plasma jet about said central axis.

18. The railgun ignition device of claim 17, wherein said means for spinning is electromagnetic.

19. The railgun ignition device of claim 18, wherein said means for spinning comprises a solenoidal electromagnet.

20. The railgun ignition device of claim 1, wherein a distance between said electrical connection and said plasma initiation end is greater than or equal to a diameter of said bore.

21. The railgun ignition device as recited in claim 1, further comprising a third electrode located between said first and second electrodes at said plasma initiation end.

22. The railgun ignition device as recited in claim 1, further comprising at least one augmenting conductor located substantially parallel with and located adjacent each of said first and second electrodes.

23. The railgun ignition device as recited in claim 1, said holding plug including an open end between said plasma initiation end and said muzzle end of said bore.

24. The railgun ignition device as recited in claim 1, said holding plug including an open end, said plasma initiation end of said bore being between said open end and said muzzle end of said bore, said muzzle and extending beyond said open 25. A combustion system comprising:
at least one combustion chamber;
at least one railplug connected to each combustion chamber, each railplug including:
   a holding plug including means for connecting said railplug to a respective combustion chamber,
   first and second spaced part electrodes along a central axis together defining a bore having a muzzle end disposed within said respective combustion chamber, and a plasma initiation end, said first electrode being electrically insulated from said holding plug, a length of said bore being equal to a distance between said muzzle end and said plasma initiation end and a width of said bore being equal to a spacing between said first and second electrodes at said muzzle end, an aspect ratio of said bore being at least 3:1,
   an electrical connection between said second electrode and said holding plug, said plasma initiation end being between said electrical connection and said muzzle end; and
   a power source for supplying pulsed electrical energy to each railplug.

26. The combustion system of claim 25, a distance between said electrical connection and said plasma initiation end being greater than or equal to a diameter of said bore.

27. The combustion system as recited in claim 25, each railplug further including a third electrode located between said first and second electrodes at said plasma initiation end.

28. The combustion system as recited in claim 27, said power source including means for applying a high voltage between said second and third electrodes to initiate a plasma, and for applying a low voltage between said first and second electrodes after initiation of said plasma.

29. The combustion system as recited in claim 25, each railplug further including at least one augmenting conductor substantially parallel and located adjacent each of said first and second electrodes.

30. The combustion system as recited in claim 25, said holding plug of each railplug including an open end between said plasma initiation end and said muzzle end of said bore, said muzzle end extending into said respective combustion chamber.

31. The combustion system as recited in claim 25, said holding plug of each railplug including an open end, said plasma initiation end of said bore being between said open end and said muzzle end, said muzzle end extending into said respective combustion chamber.

32. The combustion system of claim 25, said aspect ratio being at least 6:1.

33. The combustion system of claim 32, said aspect ratio being at least 10:1.

34. The combustion system of claim 25, said power source comprising a compulsator.

35. The combustion system of claim 25, said power source comprising an electronic ignition.

36. The combustion system of claim 25, said power source comprising:
a high energy power supply, supplying low current to initiate a plasma at said plasma initiation end of each railplug and a peak current exceeding said low current; and
means for selectively coupling current from said high energy power supply to each railplug at pulse intervals.

37. An internal combustion engine for rotating a crankshaft, comprising:
at least one combustion chamber;
at least one railplug connected to each combustion chamber, each railplug including:
   a holding plug including means for connecting said railplug to a respective combustion chamber,
   first and second spaced part electrodes, said first electrode being electrically insulated from said holding plug, said electrodes extending along an axis and defining a bore having a plasma initiation end and a muzzle end, a ratio of a length of said bore to a distance between said electrodes being at least 3:1,
   an electrical connection between said second electrode and said holding plug, said plasma initiation end being between said electrical connection and said muzzle end; and
pulse generating means, timed by said crankshaft, for applying timed electrical energy pulses to said electrodes of each railplug.

38. The internal combustion engine of claim 37, said ratio being at least 6:1.

39. The internal combustion engine of claim 37, said ratio being at least 10:1.

40. The internal combustion engine of claim 37, a distance between said electrical connection and said plasma initiation end being greater than or equal to a diameter of said bore.

41. The internal combustion engine of claim 37, said pulse generating means comprising a compulsator.

42. The internal combustion engine of claim 37, said pulse generating means comprising an electronic ignition.

43. The internal combustion engine as recited in claim 37, each railplug further including a third electrode located between said first and second electrodes at said plasma initiation end.

44. The internal combustion engine as recited in claim 43, said pulse generating means including means for applying a high voltage between said second and third electrodes to initiate a plasma, and for applying a low voltage between said first and second electrodes after initiation of said plasma.

45. The internal combustion engine of claim 37, each railplug further including at least one augmenting conductor substantially parallel with and located adjacent each of said first and second electrodes.

46. The internal combustion engine as recited in claim 37, said holding plug including an open end between said plasma initiation end and said muzzle end of said bore, said muzzle end extending into said respective combustion chamber.

47. The internal combustion engine as recited in claim 37, said holding plug including an open end said plasma initiation end of said bore being between said open end and said muzzle end, said muzzle end extending into said respective combustion chamber.

48. A continuous combustion engine comprising:
    at least one continuous combustion chamber;
    at least one railplug connected to each continuous combustion chamber, each railplug including:
        a holding plug including means for connecting said railplug to a respective continuous combustion chamber,
        first and second spaced part electrodes, said first electrode being electrically insulated from said holding plug, said electrodes extending along an axis and defining a bore having a plasma initiation end and a muzzle end, a ratio of a length of said bore to a distance between said electrodes being at least 3:1,
        an electrical connection between said second electrode and said holding plug, said plasma initiation end being between said electrical connection and said muzzle end; and
        a power source for applying at least one electrical energy pulse to said electrodes of each railplug.

49. The continuous combustion engine of claim 48, a distance between said electrical connection and said plasma initiation end being greater than or equal to a diameter of said bore.

50. The continuous combustion engine of claim 49, said ratio being at least 6:1.

51. The continuous combustion engine of claim 48, said ratio being at least 10:1.

52. The continuous combustion engine of claim 48, said power source comprising a compulsator.

53. The continuous combustion engine of claim 48, said power source comprising an electronic ignition.

54. The continuous combustion engine as recited in claim 48, each railplug further including a third electrode located between said first and second electrodes at said plasma initiation end.

55. The continuous combustion engine as recited in claim 48, said power source including means for applying a high voltage between said second and third electrodes to initiate a plasma, and for applying a low voltage between said first and second electrodes after initiation of said plasma.

56. The continuous combustion engine as recited in claim 48, each railplug further including at least one augmenting conductor substantially parallel with and located adjacent each of said first and second electrodes.

57. The continuous combustion engine as recited in claim 48, said holding plug of each railplug including an open end between said plasma initiation end and said muzzle end of said bore, said muzzle end extending into said respective continuous combustion chamber.

58. The continuous combustion engine as recited in claim 48, said holding plug of each railplug including an open end, said plasma initiation end of said bore being between said open end and said muzzle end, said muzzle end extending into said respective continuous combustion chamber.

59. An ignition device for generating and injecting a high energy plasma jet into a combustion chamber, comprising:
    a holding plug including means for mounting said ignition device in a utilization apparatus; and
    first and second spaced apart electrodes, at least one of said electrodes extending helically around a central axis, said electrodes defining a bore having a muzzle end and a plasma initiation end, a bore width being equal to a distance between said first and second spaced apart electrodes, and a bore length being equal to a distance between said muzzle end and said plasma initiation end of said bore, an aspect ratio of said bore being at least 3:1; and
    an electrical connection between one of said first and second spaced apart electrodes and said holding plug, said plasma initiation end being between said electrical connection and said muzzle end.

* * * * *

UNITED STATES PATENT AND TRADEMARK OFFICE
CERTIFICATE OF CORRECTION

PATENT NO. : 5,211,142

DATED : May 18, 1993

INVENTOR(S) : Ronald D. Matthews, Steven P. Nichols, William F. Weldon; Mark M. Koeroghlian, Richard W. Faidley It is certified that error appears in the above-identified patent and that said Letters Patent is hereby corrected as shown below:

In claim 24, column 19, line 32: after the word 'open' insert the word --end.--.

In claim 25, column 19, line 39: after the word 'electrodes' insert the word --extending--.

Signed and Sealed this

Twenty-first Day of December, 1993

Attest:

BRUCE LEHMAN

*Attesting Officer*  *Commissioner of Patents and Trademarks*